(No Model.)

J. R. CUMMINS.
PLOW.

No. 325,239. Patented Sept. 1, 1885.

Witnesses:
C. T. Beer
O. A. Clark

Inventor:
John R. Cummins
By Paine & East,
Attys.

United States Patent Office.

JOHN RANDOLPH CUMMINS, OF McKINNEY, TEXAS, ASSIGNOR OF TWO-THIRDS TO FRANCIS EMERSON AND JOSEPH J. FAIRES, OF SAME PLACE.

PLOW.

SPECIFICATION forming part of Letters Patent No. 325,239, dated September 1, 1885.

Application filed June 2, 1885. (No model.)

*To all whom it may concern:*

Be it known that I, JOHN R. CUMMINS, a citizen of the United States, residing at McKinney, in the county of Collin and State of Texas, have invented certan new and useful Improvements in Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to common turning-plows; and it consists in the combination therewith of a landside share attachment, as hereinafter fully described and claimed.

Prior to my invention a large amount of the power necessary for driving a plow has been rendered unavailable owing to the great friction existing between the perpendicular landside and the plow, which is caused by the inclined or curved form given to the cutting-share and the mold-board.

Various forms of landside attachments, consisting of wheels and rollers, for lessening the friction have been employed to make the plow draw easier.

In carrying out my invention I attach to the draw-bar or share of a common turning-plow a horizontal cutting-blade, which slopes outward from the point of the plow. This blade is provided with a flange and with suitable bolts and nuts for securing it firmly to the plow, so that the horizontal portion of it makes an under-cut in the perpendicular landside in a line with the bottom of the furrow. The form of the blade which slopes outward keeps the plow in a straight line and relieves it from much of the friction caused by the share and mold-board pressing it against the landside. The under-cut at the bottom of the furrow enables the same plow to take a considerably wider cut during its next journey across the field.

I will now proceed to describe my invention more particularly with reference to the accompanying drawings, in which—

Figure 1:
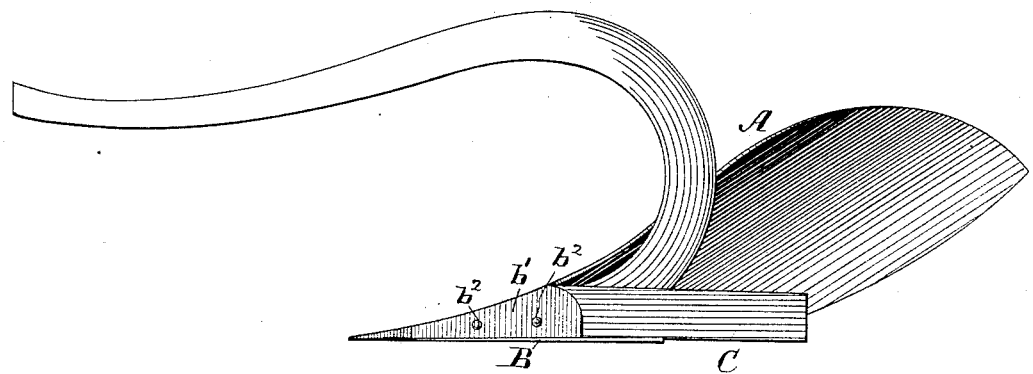
Figure 2:
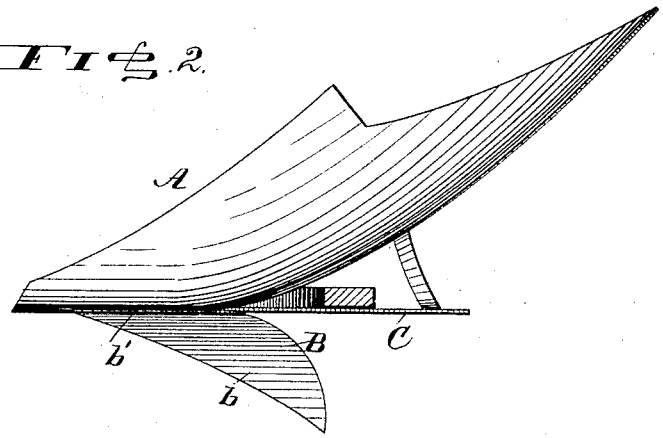

Figure 1 is a side view of portions of a plow provided with my attachment. Fig. 2 is a plan view of the same.

Similar letters of reference indicate corresponding parts in both views.

A is a common turning-plow, to which the landside share attachment is applied.

B is the landside share attachment, which consists of a horizontal blade, $b$, which slopes outward from the point of the plow. $b'$ is a flange, which projects upward from the said blade, and is provided with holes in it, through which the bolts $b^2$ pass and secure the said flange firmly to the plow. That edge of blade $b$ which slopes outward from the point of the plow is made sharp, so that it makes a horizontal under-cut in the landside in a line with the bottom of the furrow. The slope or angle given to the cutting-edge keeps the plow in a straight line, and enables the said plow to make a wider cut in its next journey across the field with a less amount of draft-power than it could make if unprovided with this attachment.

C is the ordinary landside attachment, which is fastened to the plow in rear of the landside share attachment B, so that it can be removed from the plow when required without interfering with the said landside share.

Having thus described my invention, what I claim as new, and desire to secure by Letters Patent, is—

The combination, with a plow, of the landside share attachment B, provided with the horizontal blade $b$, sloping outward from the point of the plow, made sharp on the said sloping edge, and having the flange $b'$ projecting upward from the horizontal blade, and the bolts $b^2$ for securing the said flange and plow together, and the removable landside attachment C, substantially as described and shown, and for the purpose set forth.

In testimony whereof I affix my signature in presence of two witnesses.

JOHN RANDOLPH CUMMINS.

Witnesses:
FRANCIS EMERSON,
H. BALDRIDGE.